US006579013B2

United States Patent
Gaio et al.

(10) Patent No.: US 6,579,013 B2
(45) Date of Patent: Jun. 17, 2003

(54) OPTICAL FIBER COUPLER AND AN OPTICAL FIBER COUPLER INCORPORATED WITHIN A TRANSCEIVER MODULE

(75) Inventors: David P. Gaio, Rochester, MN (US); William K. Hogan, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 189 days.

(21) Appl. No.: 09/809,650

(22) Filed: Mar. 15, 2001

(65) Prior Publication Data

US 2002/0131721 A1 Sep. 19, 2002

(51) Int. Cl.[7] ................................................. G02B 6/38
(52) U.S. Cl. ............................ 385/60; 385/66; 385/78
(58) Field of Search ............................ 385/56, 58, 60, 385/66, 77, 78, 84

(56) References Cited

U.S. PATENT DOCUMENTS

2001/0014197 A1 * 8/2001 De Marchi ................. 385/77

OTHER PUBLICATIONS

U.S. Ser. No. 09/809,699 (Atty. Docket No. ROC920010018US1), entitled: Compact Optical Transceivers Including Thermal Distributing and Electromagnetic Shielding Systems and Methods Thereof.
U.S. Ser. No. 09/809,531 (Atty. Docket No. ROC920010015US1), entitled: Technique and Apparatus for Compensating for Variable Lengths of Terminated Optical Fibers in Confined Spaces.
U.S. Ser. No. 09/809,127 (Atty. Docket No. ROC920010054US1), entitled: High Frequency Matching Method and Silicon Optical Bench Employing High Frequency Matching Networks.

* cited by examiner

Primary Examiner—Hemang Sanghavi
Assistant Examiner—Omar Rojas
(74) Attorney, Agent, or Firm—Allen, Dyer, Doppelt Milbrath & Gilchrist P.A.

(57) ABSTRACT

A coupler to interconnect or couple optical fibers together and position ends of the optical fibers juxtaposed with each other, additionally includes a captive split tubular alignment sleeve to accept ferrules on ends of optical fibers to be aligned and coupled. The coupler may be incorporated into an opto-electronic module, captured, and then held against normal forces of connecting and disconnecting the optical fiber. A short optical fiber extends from the coupler through a wall of an enclosure and is terminated adjacent an opto-electronic device to carry optical signals for transmission or reception of optical signals. This coupler may be further used to splice or interconnect optical fibers, in temporary connections or splices, without fusing the glass of the fibers.

26 Claims, 3 Drawing Sheets

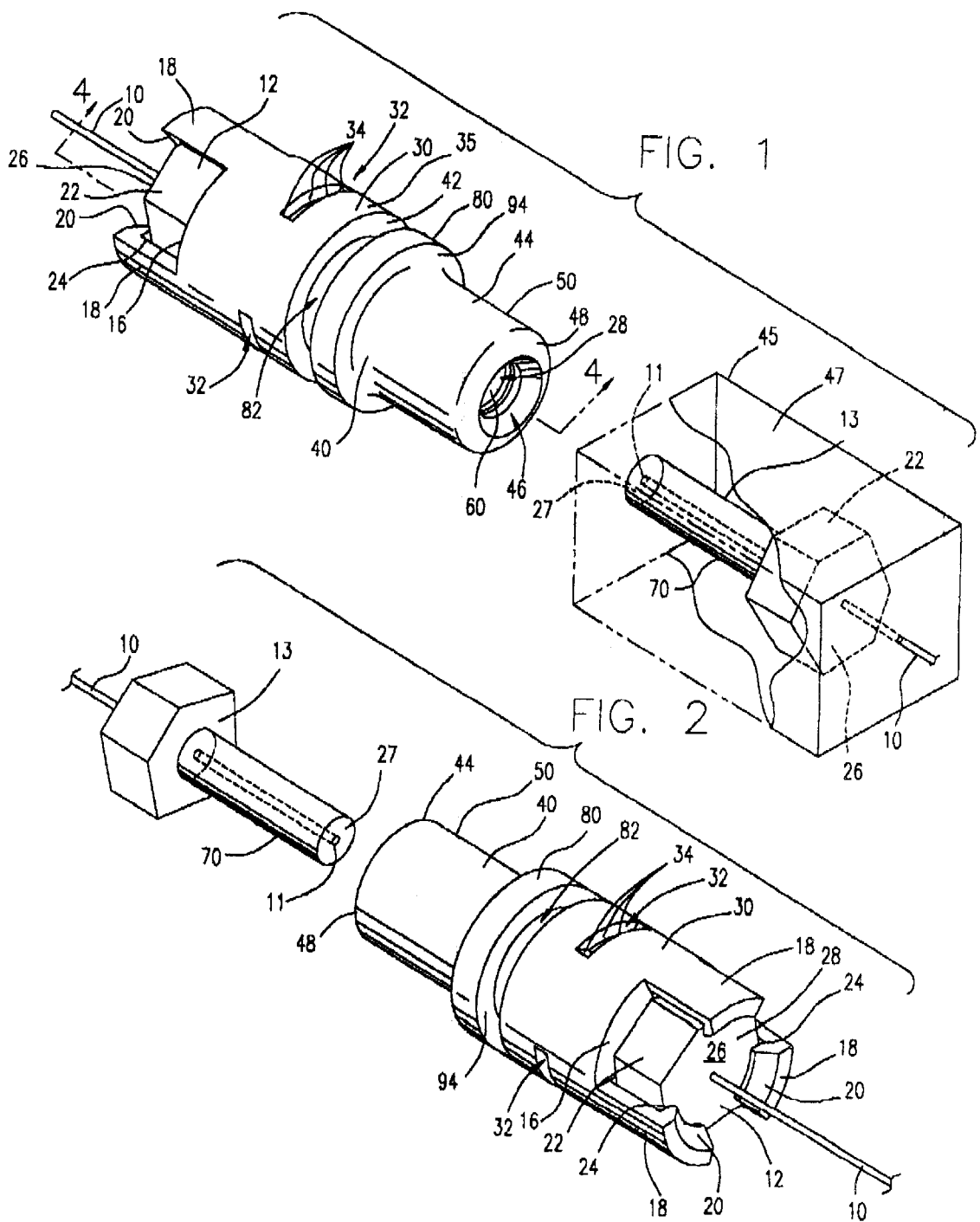

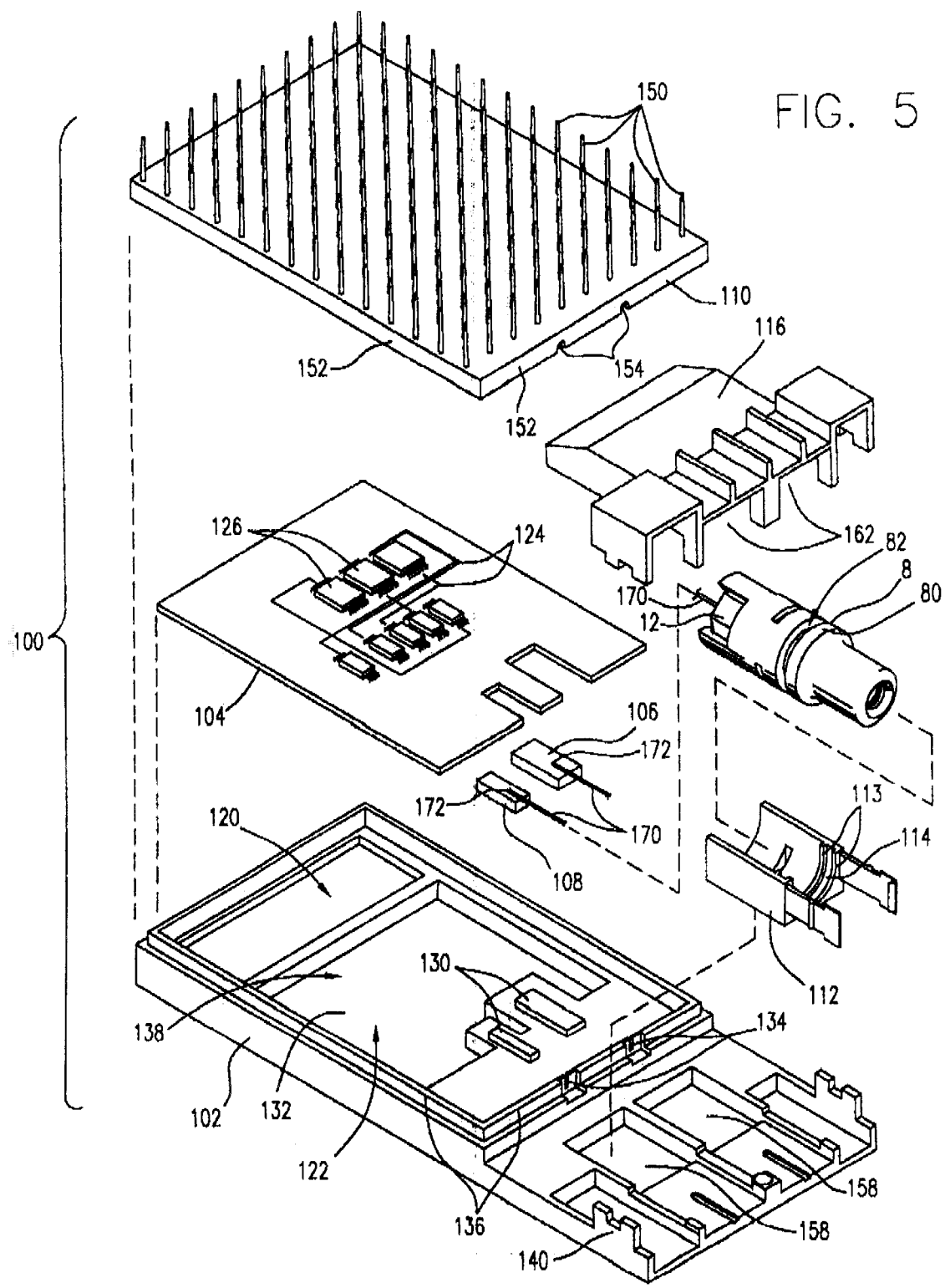

OPTICAL FIBER COUPLER AND AN OPTICAL FIBER COUPLER INCORPORATED WITHIN A TRANSCEIVER MODULE

CROSS REFERENCE TO RELATED CO-PENDING UNITED STATES PATENT APPLICATIONS

The present application is related to the following commonly assigned and co-pending United States Patent Applications:

U.S. Ser. No. 09/809,699, entitled: COMPACT OPTICAL TRANSCEIVERS INCLUDING THERMAL DISTRIBUTING AND ELECTROMAGNETIC SHIELDING SYSTEMS AND METHODS THEREOF;

U.S. Ser. No. 09/809,531, entitled TECHNIQUE AND APPARATUS FOR COMPENSATING FOR VARIABLE LENGTHS OF TERMINATED OPTICAL FIBERS IN CONFINED SPACES; and U.S. Ser. No. 09/809,127, entitled: HIGH FREQUENCY MATCHING METHOD AND SILICON OPTICAL BENCH EMPLOYING HIGH FREQUENCY MATCHING NETWORKS; all filed concurrently herewith and all incorporated herein as a part hereof.

FIELD OF THE INVENTION

This invention relates to the field of optical signal transmission and reception over optical fibers and, more specifically, to the interconnection of optical fibers within a transceiver module with optical fibers and connectors of an optical fiber cable.

BACKGROUND OF THE INVENTION

In order to interconnect network optical fibers to opto-electronic devices, such as transmit optical sub-assemblies or receive optical sub-assemblies of a computer or server, a typical technique uses a relatively, long optical fiber or pigtail with an interfacing connector on one end thereof. The optical fiber and connector are typically assembled with the optical fiber routed to an opto-electronic device which either produces or receives an electronically generated and controlled optical signal. The assembled device is installed into a host device, and the interfacing connector then is positioned and fixed to the host device.

This handling and positioning of a relatively long pigtail of optical fiber seriously exposes the optical fiber pigtail to damage and breakage, because the optical fiber is very fragile and cannot be sharply bent. Any rough handling or sharp bending of an optical fiber, during manufacture and assembly will cause cracking or breakage of the optical fiber, thereby rendering the optical sub-assembly useless and necessitating replacement of the optical fiber. Replacement of the optical fiber is not always practical, resulting in the entire opto-electronic subassembly becoming useless.

Because the pigtail may be exposed to outside forces after assembly, the optical fiber continues to be subject to damage and must be shielded and protected as well as being provided with connection techniques that will not damage the optical fiber.

Consequently, it is desirable to prevent such possible damage by making the pigtail as short as possible to prevent excessive stresses on the optical fiber pigtail during assembly and handling.

OBJECTS OF THE INVENTION

It is an object of the invention to couple a pair of optical fibers together in a simple, reliable manner.

It is another object of the invention to couple a pair of optical fibers without the use of any special tools.

It is a further object of the invention to eliminate the use of long and easily damaged pigtails of optical fiber of opto-electronic devices and modules.

It is an additional object of the invention to reduce the incidence of breakage of optical fibers, which are attached to opto-electronic devices, during assembly and handling.

It is still another object of the invention to permit minor misalignment of an opto-electronic device of a transceiver module relative to a connector by utilizing a short pigtail of optical fiber, and which is entirely contained within the module and protected from damage.

Other Objects of the Invention will become apparent to one of skill in the art once the invention is fully understood.

SUMMARY OF THE INVENTION

In order to accomplish the objects of the invention and overcome the problems and shortcomings of the prior art approaches to fabricating and assembling opto-electronic modules with long optic fiber pigtails, any associated potential for pigtail damage must be considered during the critical periods of assembly and connection, where breakage or damage is most likely. Utilizing an optical fiber coupler to interconnect the optical fibers, an optical signal transmitter/receiver module which houses the opto-electronic devices and supports couplers for the optical fibers does not require long optical fiber pigtails.

This optical fiber coupler utilizes a pair of mating, snap-together, tubular shells or members in order to trap and contain a split tubular sleeve. The split tubular sleeve will admit the ends of optical fibers and ferrules attached to the optical fibers and position the optical fiber ends in an aligned, juxtaposed position, thus permitting maximum light transmission across the gap interface between end faces of the optical fibers.

The coupler structure is provided with exterior annular recesses and flanges which mate with a support cradle having complementary flanges and recesses. The support cradle is disposed in and retained in an extended portion of a transceiver module housing. Once assembled, the aligned notches in a cover of the transceiver module housing wall and one wall of a mating module housing cover form a port. An optical fiber may extend through the resulting port and extend between the opto-electronic devices within the module housing and the coupler in the extended housing. The extended housing forms a channel for each coupler and further guides the external cable connector as the ferrule of an external cable connector is inserted into the split coupling sleeve of the coupler.

The most fragile part of the entire opto-electronic transceiver module is the short pigtail of optical fiber extending through an opening in the wall and into the coupler. The coupler allows fixed mounting and retention of the exterior end of an optical fiber, minimizing the potential for damage to the optical fiber during both assembly of the transceiver module and later use of the module such as during connection or disconnection of external optical fiber ends.

This Summary of the Invention is provided as a brief summary description of the invention and is not intended to be used to limit the scope of the invention in any manner.

A more detailed and complete understanding of the invention may be acquired from the attached drawings and the Detailed Description of the Invention which follow.

BRIEF DESCRIPTION OF THE DRAWINGS

FIG. 1 is an isometric view of the optical fiber coupler of the invention in its assembled form, viewed from the exterior end thereof.

FIG. 2 is an isometric view of the optical fiber coupler of the invention in its assembled form, viewed from the interior connection end thereof.

FIG. 5 is an exploded view of a transceiver module in which the coupler is installed in the preferred embodiment of the invention.

DETAILED DESCRIPTION OF THE PREFERRED EMBODIMENT OF

THE BEST MODE AS CONTEMPLATED BY THE INVENTORS FOR CARRYING OUT THE INVENTION

Figure 3:
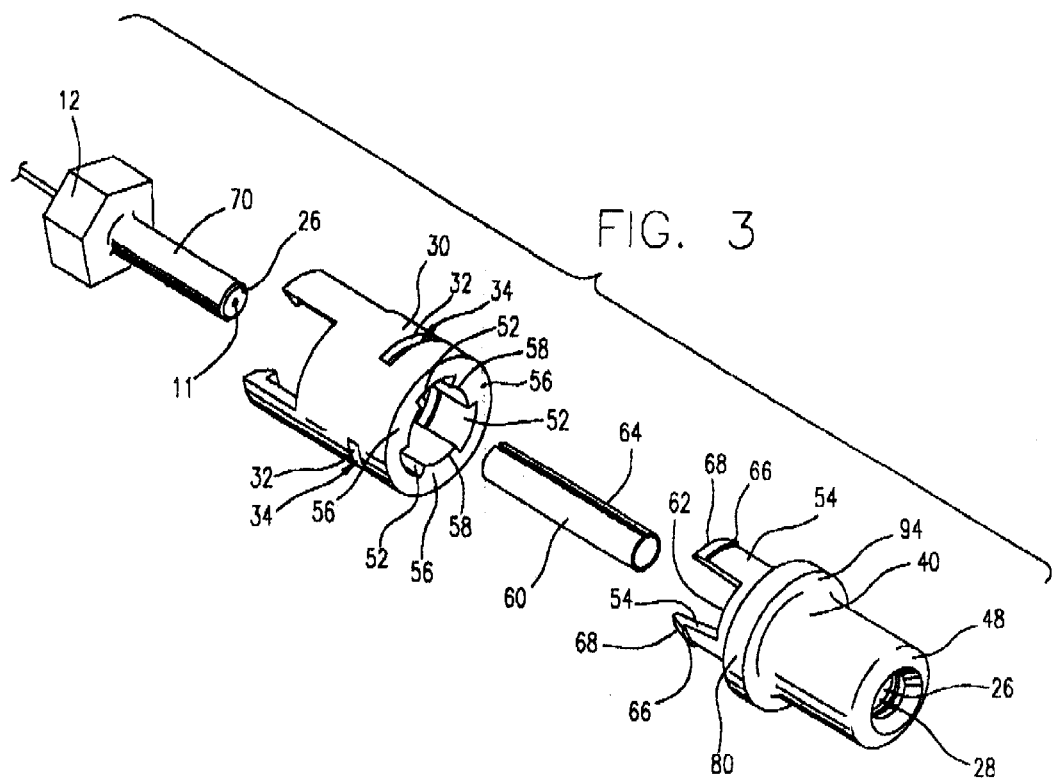
FIG. 3 is an exploded isometric view of the optical fiber coupler of the invention viewed from the exterior connection end thereof.

Referring initially to FIGS. 1 and 2, the coupler 8 of the invention is illustrated in elevated isometric views from each end thereof.

An optical fiber 10 is shown inserted into a ferrule 12. The ferrule 12 is attached to the optical fiber 10 either by potting the optical fiber 10 within the ferrule 12 with an epoxy or other hard setting potting compound to fix the optical fiber 10 relative to ferrule 12. If the optical fiber 10 is metal clad, the ferrule 12 and the clad optical fiber 10 may be soldered. Polished end face 11 of optical fiber 10 is preferably flush with the end face 26 of the ferrule 12 and the end face and the optical fiber are slightly rounded into a convex end face 26. The ferrule 12 is shown inserted into a first coupler member 30.

A plurality of latch retainers 18 are formed on one end 16 of the first coupler member 30. Latch retainers 18 each have tapered surfaces 20 which converge and form camming surfaces 20 so they engage the enlarged portion 22 of ferrule 12. Latch retainers 18 are forced to flex and permit the passage of enlarged portion 22 of ferrule 12 during connection of optical fibers 10. After ferrule 12 is inserted fully into the coupler member 30, the latch retainers 18 flex to their original form, and thus dispose latch faces 24 juxtaposed with the rear end face 26 of ferrule 12. This latching action retains the ferrule 12 and its attached optical fiber 10 relative to the coupler member 30.

In general, the key aspect of coupling two optical fibers 10 is that the end faces 11 of the fiber 10 must be placed very closely juxtaposed to each other and must be as precisely aligned as possible. Also, the end faces 11 of the optical fibers 10 should be perpendicular to the axis of the fiber 10. This may be readily accomplished by potting the optical fiber 10 or soldering the optical fiber 10 to the ferrule 12, 13 and then polishing the fiber end 11 with a slight radius so as to physically contact the ends of both fibers upon insertion within sleeve 60.

Refer now to FIG. 2. The manufacturing of various surfaces on the coupling members 30, 40 ferrules 12, 13 and the interior passage 28 therethrough is virtually impossible to control to a degree necessary to insure precise alignment of the axis of optical fiber 10 and a ferrule 12 with a second coupled optical fiber 10 and a second ferrule 13.

The structure of the first coupler member 30 is formed with openings 32 defined by surfaces 34. The openings 32 and, more particularly, surface 34 which is most distant from the ferrule 12 provide latch surfaces to engage the second coupler member 40.

Second coupler member 40 is inserted into the end 42 of the first coupler member 30 distal from the ferrule 12. The second coupler member 40 latches to the first coupler member 30 as will be described below with reference to FIGS. 3 and 4.

Again referring to FIGS. 1 and 2, the second coupler member 40 has an extending tubular section 44 with an opening 46 in exterior end 48, the end 48 distal from and projecting away from the mating end 42 thereof which mates with and latches to the first coupler member 30.

The tubular section 44 provides an entrance port through opening 46 for insertion of a second ferrule 13, similar to ferrule 12. To assist in the insertion of a ferrule 13 into the coupler member 40, a mating connector housing 45 may be disposed around ferrule 13. Additionally, exterior surface 50 of section 44 provides a guide for a mating connector 47 which includes ferrule 13 to assist in the insertion of ferrule 13 into optical fiber alignment sleeve 60.

Confined within the assembled coupler members 30, 40 is a split tubular optical fiber alignment sleeve 60. Alignment sleeve 60 provides an aligning function for the ferrules 12, 13. Aligning the ferrules 12, 13 and the optical fibers 10 with a moveable or floating split sleeve 60 allows additional freedom for movement of the ferrules 12, 13 in relation to coupler members 30, 40 and, therefore, reduces costs. The inside diameter of the split sleeve 60 is slightly smaller than the diameter of the mating ferrules 12, 13 and is forced open or spread at the split to admit the ferrules 12, 13 and the optical fiber cable ferrule 13 into each end of the sleeve 60. The insertion of ferrules 12, 13 forces sleeve 60 to open and causes the ferrules 12, 13 to be frictionally retained within the coupler 8; the constricting spring force of the sleeve 60 centers ferrules 12, 13 and thereby centers and axially aligns the optical fibers 10 relative to the sleeve 60 and thus relative to each other. With proper dimensional control of the projecting ends 70, the end faces 26 of ferrules 12, 13 are finally disposed closely juxtaposed with each other within the sleeve 60 and closely aligned for maximum coupling and transfer of the optical signals between the two optical fibers 10.

Referring to FIG. 3, mating ferrules 12, 13 and the components of the coupler assembly 8 are illustrated in an exploded isometric view, along with the mating ferrules, 12, 13. The first coupler member 30 is formed with longitudinal channels 52 formed and spaced around the interior periphery of the central channel 46 through member 30. The grooves 52 are formed to accept and constrain against lateral or twisting movement of latching retainer arms 54 within first coupler member 30. The channels 52 are aligned with the openings 32 through the sidewall 35 of the first coupler member 30. The concave surface 58 of the first coupler member 30 restricts but does not eliminate the amount of lateral freedom of split sleeve 60.

The end surface of lands 56 engage segmented annular surface 62 intermediate latching retainer arms 54 of the second coupler member 40 to prevent excessive insertion forces being transferred by the coupler member 40 onto the split sleeve 60. While split sleeve 60 possesses sufficient resilience in a radial direction to firmly grip the projecting end 70 of the ferrules 12, 13, the sleeve 60 does not possess sufficient columnar strength to withstand axial compression by the coupler members 30, 40. Therefore, the sleeve 60 must spread or open at the split 64 to admit ferrules 12, 13 and withstand the insertion forces.

Latch fingers 54 of coupler member 40 are long enough to dispose latch portions 68 within opening 32, positioning latch surface 66 juxtaposed with surface 34 once fully inserted to the point that lands 56 are engaged with segmented annular surface 62. The internal channels 28 of coupler members 40 are dimensioned so that the diameters are larger than the outside diameter of sleeve 60 as expanded by the ferrules 12, 13.

Figure 4:
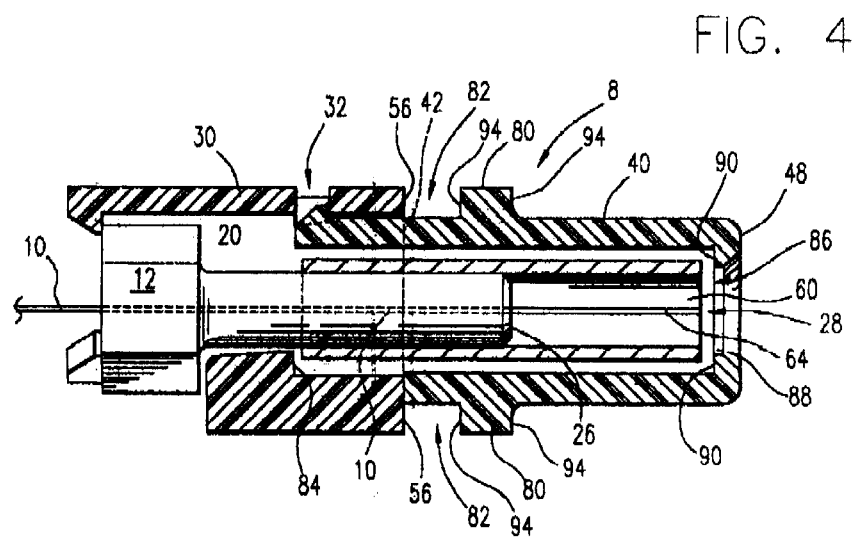
FIG. 4 is a section view, taken along line 4—4 in FIG. 1 of the coupler of the invention, with a transceiver terminated optical fiber and associated ferrule disposed in connection with the coupler.

Referring now to FIG. 4, a sectional view of the assembled coupler members 30, 40 containing split sleeve 60 is illustrated. First coupler member 30 is formed during a molding operation to include at least a significant segment of an internal annular flange surface 84. The annular flange surface 84 preferably is interrupted with gaps therein corresponding to and aligned with the arcuate spans of the openings 32 extending through the sidewalls 35 of the first coupler member 30. The flange surface 84 or flange segment surfaces 84 define a barrier with an opening diameter smaller than the outside diameter of the undeflected or unexpanded sleeve 60.

Similarly, the second coupler member 40 is formed to have a reduced diameter entry port 86 in the end 48 thereof, relative to the outside diameter of the unexpanded sleeve 60. The entry port 86 is defined by an inwardly extending radial flange 88 forming an annular flange surface 90. Flange surface 90 and flange surface 84 cooperate to trap and retain sleeve 60 within the assembled coupler 8. Sleeve 60 is intentionally shorter than the axial distance between flange surfaces 84, 90 so as to prevent a columnar compression of the sleeve 60 during assembly of the coupler members 30, 40 into coupler 8.

Flange 80 is formed extending radially from the exterior surface of coupler member 40 at a position which forms or leaves an annular recess 82 between surface 56 of coupler member 30 and flange 80. The flange 80 provides a pair of surfaces 94 which may be accepted by cradle 112 or cradle member 112. Cradle 112 has complementary inwardly extending partial or complete flanges 113 to hold the coupler member 40 against axial dislocation from the forces of insertion of the ferrule 13 into sleeve 60 and the forces encountered upon disconnection or withdrawal of ferrule 13 from sleeve 60.

A transceiver module may be advantageously constructed using the coupler assembly 8.

FIG. 5 illustrates an exploded isometric form of such a transceiver module 100. The transceiver module 100 comprises a base 102, an electronic circuit board 104 or circuit card 104, a transmit optical subassembly 106 (TOSA), a receive optical subassembly 108 (ROSA), a cover 110, a cradle 112, a coupler 8, and a coupler cradle cover 116.

The base 102 is preferably fabricated from aluminum or other metal or alloy with high thermal conductivity properties. Base 102 is formed or otherwise provided with a port 120 or opening 120 that will accept a connector (not shown) for connecting the circuit board or card 104 to the electronics of a host device (not shown). Conventional connectors may be used to accomplish such connections; alternatively, electronic connections may be provided with a plurality of via connections through base 102 and may be attached by a solder ball array on the via connections to an electronic circuit board of the host (not shown).

An electronic circuit board 104 is disposed inside chamber 122 formed within and by the base 102 and supports conductors 124 and electronic components 126 mounted on the circuit board 104 to drive, control or convert and convey electronic signals to and from the TOSA 1060 and ROSA 108, respectively.

The base 102 is formed or otherwise provided with pedestals 130 on the floor 132 of base 102. The pedestals 130 support the ROSA 108 and the TOSA 106 and are generally aligned with holes or slots 134 formed in one of the walls 136 of enclosure 138 of base 102. The slots 134 permit easy insertion into and passage of single optical fibers 10 through the wall 136, and thus interconnect the optoelectronic subassemblies 106, 108 to couplers 8.

Base 102 is further provided with an extension 140 for supporting optical fiber couplers 8 on a shelf-like member 140 which extends from the enclosure 138 and is formed to accept and retain a cradle 112. The cradle 112 is formed to have a partial annular groove 114 in the interior thereof to accept and capture flange 80 of the coupler 8 and prevent longitudinal movement of the coupler 8 whenever ferrule 13 is being inserted into or removed from coupler 8 and sleeve 60.

Cradle cover plate 116 mates with structure of shelf 140 both to retain coupler 8 within cradle 112 and trap cradle 112 in recesses 158 in shelf 140. Cover plate 116 comprises channels 162 formed therein to guide connectors 47, which incorporate the cable ferrule 13, during insertion of the cable ferrule 13 into coupler 8 and sleeve 60, removing the need to precisely align ferrule 13 with the second coupler member 40.

Enclosure 138 of base 102 is mated with a cover plate 110. Cover plate 110 is attached to the module base 102 by screws (not shown) or other conventional attachment techniques such as adhesives or sealants, if appropriate. The cover plate 110 may be further provided with a plurality of pins 150, arranged extending outwardly therefrom, which act as cooling fins to dissipate heat generated by the optoelectronic devices 106, 108 and electronic components 126 within the chamber 122 of enclosure 138 to the surrounding air to prevent the possible overheating of the internal electrical components 126.

A wall 152 of cover plate 110 which mates with wall 136 of base enclosure 138 has holes or slots 154, which are aligned with holes or slots 134, and which holes or slots 134, 154 together form a hole whenever the cover plate 110 is installed. These holes formed by slots 134, 154 provide for passage of the optical fibers 170. Thus, the optical fibers 170 may be easily installed even if terminated by ferrules 12. The unterminated ends 172 of optical fibers 170 then can be fixed proximate the opto-electronic sub assemblies 106, 108 and the ferrule 12 terminated ends of optical fibers 170 can be inserted into coupler 8.

Module 100 may be advantageously fabricated by die casting using a zinc alloy. The die casting process is capable of producing closely dimensioned parts having complex shapes such as pedestals 130, retention slots 158, and slots 154. The zinc alloy is highly heat conductive. Die casting also can provide economical structures which have shapes that permit elimination of separate parts such as cradle 112 by incorporating the flanges 113 and groove 114 into an interior surface of the shelf-like extension 140.

The optical fiber coupler 8 may be used to connect any pair of compatible ferrule terminated optical fibers in a number of different environments. The coupler 8 along with a suitable support, forming a cradle cavity analogous to the above described cradle 112, may be used in any situation where the coupling of optical fibers must be disconnectably joined or spliced, or may be used as an emergency splice pending actual fusing or permanently splicing of the optical fibers.

The foregoing Detailed Description of the Preferred Embodiment of the Invention is intended to disclose the invention in sufficient detail that one of skill in the art may practice the invention. The Detailed Description of the Preferred Embodiment of the Invention is not intended to limit the scope of the invention in any manner.

The foregoing references to a transceiver module are made for purposes of example and illustration and are not indicative that this invention can only be used in such manner. Clearly, it should be understood that this invention may be use either in conjunction with a modular unit or as a stand alone coupler for optical fibers.

One of skill in the art will recognize that minor changes may be made in the design details of the disclosed invention while not removing the resulting devices from the scope of the claims attached hereto, such claims being intended to define the scope of the invention.

We claim:

1. An optical fiber coupler for disposing a first optical fiber having a first end face and a second optical fiber having a second end face with said end faces juxtaposed and axially aligned, comprising:
   a first coupler member comprising a hollow cylinder, said coupler member forming a plurality of openings through a side wall of said member;
   said first coupler member comprising a plurality of deflectable retainer latches extending from one end thereof;
   a second coupler member comprising a tubular cylinder, said second coupler member further comprising a radially extending flange extending from and circumscribing a portion of an external surface of said second coupler member;
   said second coupler member further comprising a plurality of latch fingers disposed equally spaced around and extending parallel with side walls of said second coupler member and from an end face of said second coupler member;
   said latch fingers retained in and engageable with said openings;
   a sleeve disposed within and retained within said first and said second coupler members;
   said flange engageable with a mating groove in a retainer structure, whereby axial force may be exerted thereon inserting said second optical fiber into said second coupler member and sleeve to optically couple the first and second optical fibers without displacing said first and second coupler members and causing damage to either of said first and second optical fibers.

2. The optical fiber coupler of claim 1, wherein said first coupler member is mated with a first ferrule surrounding and attached to one end of each said first optical fiber.

3. The optical fiber coupler of claim 2, wherein said first ferrule comprises a cylindrical portion having a diametrical dimension larger than an interior diametrical dimension of said sleeve.

4. The optical fiber coupler of claim 3, wherein said first ferrule is captured and retained within said plurality of said deflectable retainer latches.

5. The optical fiber coupler of claim 3, wherein said sleeve is a tubular member sized to be smaller than an interior passage formed by said first and second coupler members and larger than openings in unmated ends of said first and second coupler members, whereby said sleeve may be displaced within said first and second coupler members to align with said first ferrule and a second ferrule inserted into said second coupler member, whereby insertion of said first and second ferrules into said sleeve align said first and second ferrules and place said first and second ferrules in juxtaposition with each other.

6. The optical fiber coupler of claim 5, wherein said sleeve is split longitudinally along an outer wall thereof.

7. The opto-electronic assembly of claim 6, wherein said sleeve forms an interference fit with said first and second ferrules.

8. The optical fiber coupler of claim 7 wherein said sleeve is formed of a resilient metal.

9. The optical fiber coupler of claim 7 wherein said sleeve is formed of a ceramic.

10. The optical fiber coupler of claim 7, wherein said cylindrical portion of said first ferrule comprises a tapered portion proximate a distal end thereof, whereby said first ferrule is engageable with said sleeve and insertable therein without damaging said sleeve.

11. An opto-electronic assembly comprising:
   an enclosure;
   an opto-electronic component contained within said enclosure;
   an opening in an external wall of said enclosure:
      a first optical fiber extending into said opto-electronic component from said opening;
      said first optical fiber terminated with a first ferrule;
      said enclosure further comprising a positioning and retaining structure, said structure containing a coupler assembly, said coupler assembly comprising:
         a first coupler member comprising a hollow cylinder, said first coupler member forming a plurality of openings through a side wall thereof;
         said first coupler member comprising a plurality of deflectable retainer latches extending from one end thereof;
         a second coupler member comprising a hollow cylinder, said second coupler member further comprising a radially extending flange extending from and circumscribing a portion of an external surface of said second coupler member;
         said second coupler member further comprising a plurality of latch fingers disposed equally spaced around and extending parallel with side walls of said second coupler member and from an end face of said second coupler member;
         said latch fingers retained in and engageable with said openings;
         a sleeve disposed within and retained within said first and said second coupler members;
         said flange engageable with a mating groove in the positioning and retaining structure whereby axial force may be exerted thereon inserting a second optical fiber into said second coupler member and sleeve and thereby optically couple the first and second optical fibers without displacing said first and second coupler members and causing damage to either of said first and second optical fibers.

12. The opto-electronic assembly of claim 11, wherein said first ferrule is captured and retained within said plurality of said deflectable retainer latches.

13. The opto-electronic assembly of claim 11, wherein said sleeve is a tubular member sized to be smaller than an interior passage formed by said first and second coupler members and larger than openings in unmated ends of said first and second coupler members, whereby said sleeve may be displaced within said first and second coupler members to align with said first ferrule and a second ferrule inserted into said second coupler member, whereby insertion of said first and second ferrules into said sleeve align said first and second ferrules and place said first and second ferrules in juxtaposition with each other.

14. The opto-electronic assembly of claim 12, wherein said sleeve is split longitudinally along an outer wall thereof.

15. The opto-electronic assembly of claim 13, wherein said sleeve forms an interference fit with said first and second ferrules.

16. The opto-electronic assembly of claim 15 wherein said sleeve is formed of a resilient metal.

17. The opto-electronic assembly of claim 15 wherein said sleeve is formed of a ceramic.

18. The opto-electronic assembly of claim 15, wherein said first ferrule comprises a tapered portion proximate a distal end thereof, whereby said first ferrule is engageable with said sleeve and insertable therein without damaging said sleeve.

19. An optical fiber coupler assembly for disposing a first optical fiber having a first end face and a second optical fiber having a second end face with said end faces juxtaposed and axially aligned, comprising:

a first coupler member comprising a hollow cylinder, said coupler member forming a plurality of openings through a side wall of said member;

said first coupler member comprising a plurality of deflectable retainer latches extending from one end thereof;

a second coupler member comprising a tubular cylinder, said second coupler member further comprising a radially extending flange extending from and circumscribing a portion of an external surface of said second coupler member;

said second coupler member further comprising a plurality of latch fingers disposed equally spaced around and extending parallel with side walls of said second coupler member and from an end face of said second coupler member;

said latch fingers retained in and engageable with said openings;

a first ferrule terminating the first optical fiber, said first ferrule engaged and retained within said first coupler member by said plurality of deflectable retainer latches extending from said one end of said first coupler member;

a sleeve disposed within and retained within said first and said second coupler members;

said flange engageable with a mating groove in a retainer structure whereby axial force may be exerted thereon inserting said second optical fiber into said second coupler member and sleeve and thereby optically couple the first and second optical fibers without displacing said first and second coupler members and causing damage to either of said first and second optical fibers.

20. The optical fiber coupler of claim 19, wherein said first ferrule comprises a body having a tubular body portion with a diametrical dimension larger than an interior diametrical dimension of said sleeve.

21. The optical fiber coupler of claim 20, wherein said sleeve is a tubular member sized to be smaller than an interior passage formed by said first and second coupler members and larger than openings in unmated ends of said first and second coupler members, whereby said sleeve may be displaced within said first and second coupler members to align with said first ferrule and a second ferrule inserted into said second coupler member, whereby insertion of said first and second ferrules into said sleeve align said first and second ferrules and place said first and second ferrules in juxtaposition with each other.

22. The optical fiber coupler of claim 21, wherein said sleeve is split longitudinally along an outer wall thereof.

23. The optical fiber coupler of claim 22, wherein said sleeve forms an interference fit with said first ferrule.

24. The optical fiber coupler of claim 23, wherein said sleeve is formed of a resilient metal.

25. The optical fiber coupler of claim 23, wherein said sleeve is formed of a ceramic.

26. The optical fiber coupler of claim 23, wherein said cylindrical portion of said first ferrule comprises a tapered portion proximate a distal end thereof, whereby said first ferrule is engageable with said sleeve and insertable therein without damaging said sleeve.

* * * * *